US010935431B2

(12) United States Patent
    Kramer

(10) Patent No.: US 10,935,431 B2
(45) Date of Patent:     Mar. 2, 2021

(54) SENSOR ARRANGEMENT FOR MEASURING GAS TURBINE COMBUSTOR TEMPERATURES

(71) Applicant: United Technologies Corporation, Farmington, CT (US)

(72) Inventor: Stephen K. Kramer, Cromwell, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 480 days.

(21) Appl. No.: 16/138,039

(22) Filed: Sep. 21, 2018

(65) Prior Publication Data

US 2020/0300468 A1    Sep. 24, 2020

(51) Int. Cl.
    *G01J 5/02*    (2006.01)
    *G01J 5/08*    (2006.01)
    *G01J 5/00*    (2006.01)

(52) U.S. Cl.
    CPC ......... *G01J 5/0806* (2013.01); *G01J 5/0014* (2013.01); *G01J 5/0018* (2013.01); *G01J 5/08* (2013.01); *G01J 5/0893* (2013.01)

(58) Field of Classification Search
    CPC .......... G01J 5/0806; G01J 5/08; G01J 5/0014; G01J 5/0018; G01J 5/0893
    See application file for complete search history.

(56) References Cited

U.S. PATENT DOCUMENTS

| 5,578,828 | A  | * | 11/1996 | Brown ................. F01D 21/003 250/342 |
| 7,334,413 | B2 |   | 2/2008  | Myhre |
| 8,371,102 | B1 |   | 2/2013  | Lee et al. |
| 9,568,197 | B2 |   | 2/2017  | Ols et al. |
| 2004/0140095 | A1 | * | 7/2004 | Vinegar ................. E21B 43/24 166/302 |
| 2005/0263705 | A1 | * | 12/2005 | Asatani ................. G01N 21/72 250/341.1 |
| 2009/0289178 | A1 | * | 11/2009 | Haffner ................. F23N 5/082 250/227.2 |
| 2010/0313572 | A1 | * | 12/2010 | McManus ............... F23N 5/082 60/773 |
| 2011/0239621 | A1 | * | 10/2011 | Meneely ................. F23N 5/16 60/39.281 |
| 2019/0301945 | A1 | * | 10/2019 | Wang .................... G01J 5/0066 |

FOREIGN PATENT DOCUMENTS

WO    2017094965    6/2017

OTHER PUBLICATIONS

European Patent Office, European Search Report dated Feb. 27, 2020 in Application No. 19198153.9.

* cited by examiner

*Primary Examiner* — Kiho Kim
(74) *Attorney, Agent, or Firm* — Snell & Wilmer LLP

(57) ABSTRACT

A sensor system for use in a gas turbine engine. The sensor system includes a reflective surface configured to reflect optical features corresponding to combustion in a combustion chamber that exit the combustion chamber via at least one opening therein. The sensor system further includes an optical sensor configured to receive the reflected optical features from the reflective surface.

18 Claims, 6 Drawing Sheets

SENSOR ARRANGEMENT FOR MEASURING GAS TURBINE COMBUSTOR TEMPERATURES

FIELD

The present disclosure relates generally to gas turbine engines and, more particularly, to systems for detecting temperatures corresponding to combustion in a combustor section or a turbine section of a gas turbine engine.

BACKGROUND

Gas turbine engines include compressor sections to compress an airflow, combustor sections that combine the airflow with fuel for combustion and generate exhaust, and turbine sections that convert the exhaust into torque to drive the compressor sections. The combustor sections may experience relatively great temperatures. It may be desirable to identify characteristics within a combustion chamber of the combustor section, such as an air/fuel ratio or a temperature within the combustion chamber for various purposes. However, due to the relatively great temperatures within the combustor sections, it may be relatively difficult to detect this information.

SUMMARY

Described herein is a sensor system for use in a gas turbine engine. The sensor system includes a reflective surface configured to reflect optical features corresponding to combustion in a combustion chamber that exit the combustion chamber via at least one opening therein. The sensor system further includes an optical sensor configured to receive the reflected optical features from the reflective surface.

Any of the foregoing embodiments may further include a liner and shell assembly and a diffuser case defining an inner shroud and an outer shroud between the diffuser case and the liner and shell assembly, wherein the reflective surface is at least partially located in at least one of the inner shroud or the outer shroud.

In any of the foregoing embodiments, the reflective surface is at least one of located on or defined by at least one of the diffuser case or the liner and shell assembly.

In any of the foregoing embodiments, the reflective surface is suspended in at least one of the inner shroud or the outer shroud.

In any of the foregoing embodiments, the reflective surface is configured to reflect the reflected optical features through at least one of the inner shroud or the outer shroud towards the optical sensor.

Any of the foregoing embodiments may further include a fuel nozzle having a fuel nozzle stem, wherein the optical sensor is coupled to the fuel nozzle stem and located outside of the combustion chamber.

Any of the foregoing embodiments may further include an optical decoder configured to receive a signal from the optical sensor corresponding to the reflected optical features and to decode the reflected optical features.

Any of the foregoing embodiments may further include a controller coupled to the optical decoder and configured to receive a decoded signal from the optical decoder corresponding to the reflected optical features and to determine characteristics of the combustion chamber based on the decoded signal.

Any of the foregoing embodiments may further include a fuel nozzle and a trim valve configured to adjust an amount of fuel injected by the fuel nozzle, wherein the controller is further configured to control the trim valve to adjust the amount of fuel injected by the fuel nozzle based on the characteristics of the combustion chamber.

In any of the foregoing embodiments, the reflected optical features include infrared light waves, and the characteristics of the combustion chamber correspond to a temperature within the combustion chamber.

Any of the foregoing embodiments may further include a second optical sensor and a second reflective surface located axially forward or axially aft, as well as in a different circumferential or radial position, relative to the first reflective surface, wherein: the second reflective surface is configured to reflect second reflected optical features of the combustion chamber received via the second opening towards the fuel nozzle; and the second optical sensor is configured to receive the second reflected optical features from the second reflective surface.

Any of the foregoing embodiments may further include an igniter configured to ignite the fuel in the combustion chamber, wherein the optical sensor is coupled to the igniter.

Also disclosed is a sensor system for use in a gas turbine engine. The sensor system includes a combustor component in communication with a combustion chamber of the gas turbine engine. The sensor system further includes a reflective surface configured to reflect optical features corresponding to combustion in the combustion chamber towards the combustor component. The sensor system further includes an optical sensor coupled to the combustor component and configured to receive the reflected optical features.

Any of the foregoing embodiments may further include a liner and shell assembly and a diffuser case defining an inner shroud and an outer shroud between the diffuser case and the liner and shell assembly, wherein the reflective surface is configured to reflect the reflected optical features through at least one of the inner shroud or the outer shroud towards the optical sensor.

Any of the foregoing embodiments may further include an airfoil located in a high pressure turbine section of the gas turbine engine, wherein the reflected optical features correspond to the airfoil.

In any of the foregoing embodiments, the liner and shell assembly defines at least one opening into the combustion chamber; and the reflective surface is configured to reflect the reflected optical features of the combustion chamber received via the at least one opening towards the optical sensor.

In any of the foregoing embodiments, the reflective surface is at least one of located on or defined by at least one of the diffuser case or the liner and shell assembly.

In any of the foregoing embodiments, the combustor component includes at least one of a fuel nozzle or an igniter.

Also disclosed is a combustor component for use in a gas turbine engine. The combustor component includes a first section configured to be mounted to a diffuser case of the gas turbine engine. The combustor component further includes a third section configured to be in communication with a combustion chamber of the gas turbine engine. The combustor component further includes a second section extending between the first section and the third section. The combustor component further includes a sensor located on the second section and configured to detect an optical property of combustion that occurs within the combustion chamber during operation of the gas turbine engine.

In any of the foregoing embodiments, the combustor component is at least one of a fuel nozzle or an igniter.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
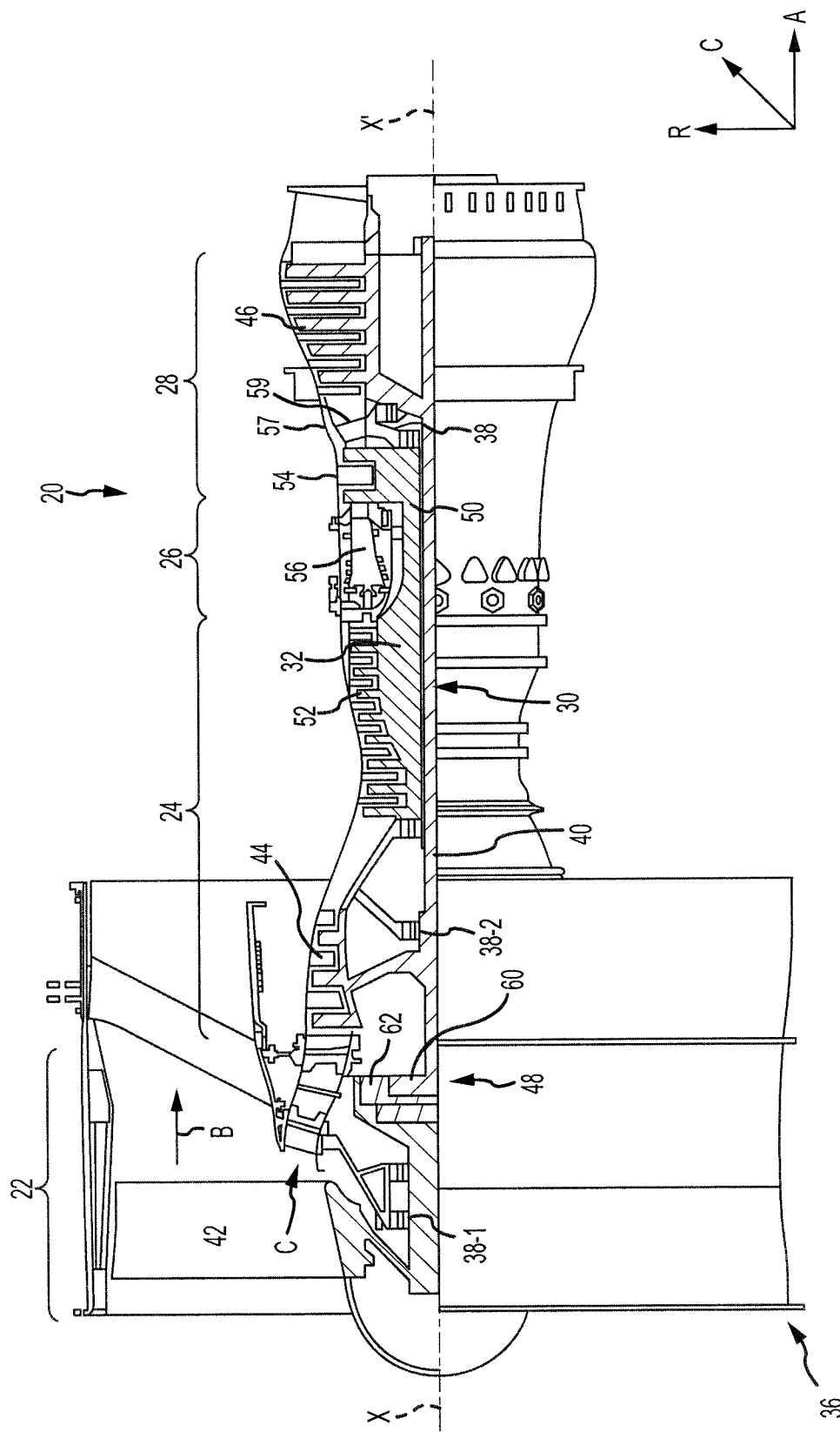
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures, geared turbofan architectures, and turboshaft or industrial gas turbines with one or more spools.

The gas turbine engine 20 generally comprises a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear diffuser case 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
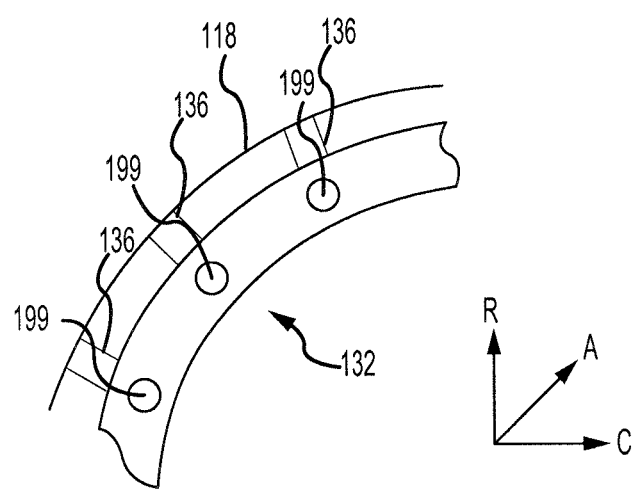
FIG. 2 is an axial view of a portion of a combustor section of FIG. 1, showing exemplary openings disposed circumferentially around the combustor section to receive fuel nozzles, in accordance with various embodiments.
Figure 3A:
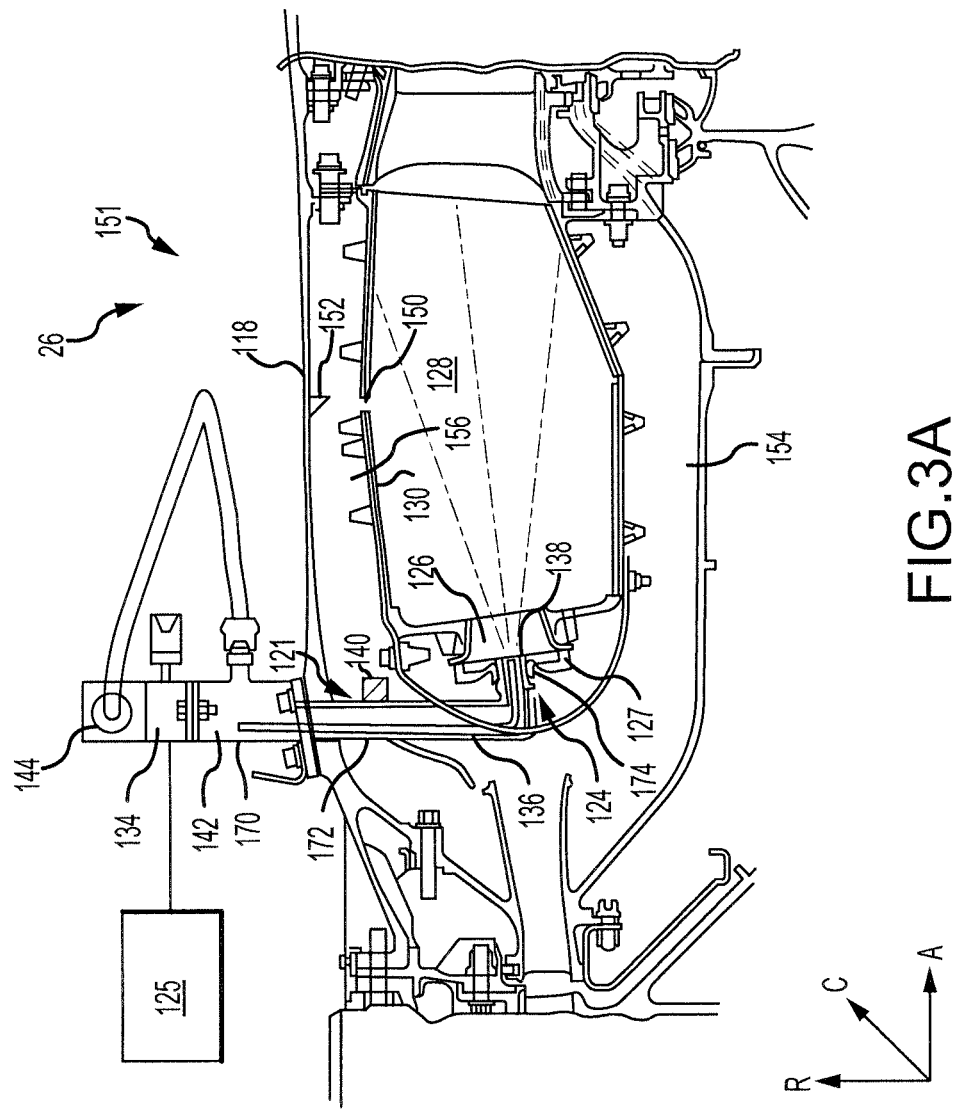
FIG. 3A is a cross-sectional view of a portion of a combustor section of the gas turbine engine of FIG. 1, in accordance with various embodiments.

In various embodiments and referring to FIGS. 2 and 3A, the combustor section 26 may include an annular combustor 132. The annular combustor 132 may include multiple fuel nozzles 124, which each include their own trim valve 134 (only one of which is illustrated in FIG. 3A). In various embodiments, each fuel nozzle 124 delivers fuel to a respective section of the combustion chamber 128. The fuel nozzles 124 may be arranged circumferentially around an axis within a combustor 132. The fuel nozzles 124 may include stems 136 that extend from a diffuser case 118 to openings 199.

Although a single fuel nozzle 124 (and other components) is shown in the drawings, one skilled in the art will realize that the combustor section 26 may include multiple openings 199 circumferentially around the combustor section 26 that receive fuel nozzles 124.

Referring now to FIG. 3A, additional features of the combustor section 26 are shown. In particular, the combustor section 26 includes a system 151 for detecting optical features corresponding to combustion in the gas turbine engine 20 of FIG. 1.

The combustor section 26, or system 151, includes a diffuser case 118. The diffuser case 118 surrounds or encloses a liner and shell assembly 130 that defines a combustion chamber 128. A fuel source 125 provides fuel to the fuel nozzle 124 for delivery to the combustion chamber 128. The fuel nozzle 124 extends through an aperture 121 in the diffuser case 118. An end of the fuel nozzle 124 may be arranged at an inlet 126 of the combustion chamber 128. A swirler 127 may provide desired airflow motion from the compressor section 24 of FIG. 1 to achieve a desired air/fuel mixture. The liner and shell assembly 130 typically includes one or more igniters used to begin combustion of the air/fuel mixture.

The liner and shell assembly 130 may include or define openings 150 that may receive air to increase an air/fuel ratio within the combustion chamber 128. In some embodiments, the openings 150 may be formed in the liner and shell assembly 130 to provide a view of features, such as optical features, within the combustion chamber 128 and may fail to provide a significant amount of air to the combustion chamber 128.

The fuel nozzle 124 includes a fuel nozzle stem 136 terminating in a fuel exit 138 that delivers fuel to the combustion chamber 128. A sensor 140 may be coupled to, or at least partially arranged within, the fuel nozzle stem 136. Fuel provided by the fuel source 125 to the fuel nozzle 124 may cool the sensor 140, or fuel within the fuel nozzle 124 may transfer heat from the sensor 140 to the fuel via the fuel nozzle stem 136.

The diffuser case 118 and the liner and shell assembly 130 may define an outer shroud 156 and an inner shroud 154 [JT1]therebetween. In various embodiments, air may flow through at least one of the inner shroud 154 or the outer shroud 156. In various embodiments, the fuel nozzle 124 may extend through the outer shroud 156 and may be extended into the inner shroud 154. In various embodiments, the sensor 140 may be located in at least one of the inner shroud 154 or the outer shroud 156. In various embodiments, the sensor 140 may be exposed to temperatures that are less than temperatures experienced within the combustion chamber 128 due to the location of the sensor 140 within the inner shroud 154 or the outer shroud 156.

A reflective surface 152 may be defined by, or located on, one or both of the diffuser case 118 or the liner and shell assembly 130. The reflective surface 152 may be designed to reflect optical features from the combustion chamber 128 that are received via the opening 150 towards the sensor 140. The reflective surface 152 may be designed to reflect the optical features within the combustion chamber 128 through one or both of the inner shroud 154 or the outer shroud 156 towards the sensor 140.

The reflective surface 152 may include, for example, a metal, a glass, or the like. In various embodiments, the reflective surface 152 may be formed on the diffuser case 118 or the liner and shell assembly 130 and may include the same material as the diffuser case 118 or the liner and shell assembly 130. For example, the material of at least one of the diffuser case 118, the liner and shell assembly 130, or the reflective surface 152 may include a nickel-based alloy, a steel, or the like. In various embodiments, the reflective surface 152 may be resistant to relatively high temperatures such as those exceeding 1000 degrees Fahrenheit (538 degrees Celsius). In various embodiments, the reflective surface 152 may include a platinum coating or another reflective coating designed to increase reflection of the optical features. In various embodiments, the reflective surface 152 may be polished to increase reflection of the optical features.

The sensor 140 may be an optical sensor. The sensor 140 may be provided by sapphire or quartz fibers or any other suitable material. There may be lenses or reflective surfaces or prisms to direct the light from the combustor through passages or fiber optics internal to the fuel nozzle 124 and stem to an optical decoder 142. The sensor 140 may communicate with an optical decoder 142. In various embodiments, the fuel nozzle 124, trim valve 134, sensor 140, and optical decoder 142 may be integrated to provide an easily replaceable unit. The sensor 140 may detect a fuel delivery parameter associated with the combustor system 116. In various embodiments, the sensor may detect a wavelength spectrum capable of detecting an amount of products of combustion or gasses associated with combustion such as oxygen, nitrogen, water, carbon monoxide, and/or carbon dioxide in the combustion chamber 128. In various embodiments, carbon dioxide and water may be the preferred gasses. For example, the sensor 140 may detect optical data corresponding to a temperature within the combustion chamber 128. For example, the sensor 140 may detect infrared light corresponding to one or more wavelengths emitted by the high temperature products of combustion such as water, carbon dioxide, or the like that corresponds to a temperature of combustion within the combustion chamber 128.

The fuel nozzle 124 may include a first section 170 (located radially outward from the diffuser case 118 and mounted to the diffuser case 118), a second section 172 (located between the diffuser case 118 and the liner and shell assembly 130), and a third section 174 (located within the liner and shell assembly 130 and mounted to the liner and shell assembly). The second section 172 may extend from the first section 170 to the third section 174. In various embodiments, the sensor 140 may be positioned on the second section 172 of the fuel nozzle 124. This may be advantageous as the second section 172 may be exposed to lesser temperatures than the third section 174, thus increasing a lifespan of the sensor 140.

A controller 144 may communicate with the sensor 140 via the optical decoder 142. In various embodiments, the optical decoder 142 may be included on a single chip with the controller 144 and, in various embodiments, the sensor 140 may likewise be integrated on the single chip. The optical decoder 142 may decode the reflected optical features received from the sensor 140. The controller 144 may receive a decoded signal from the optical decoder 142 that corresponds to the reflected optical features. The controller 144 may then determine characteristics within the combustion chamber 128 based on the decoded signal. The characteristics within the combustion chamber 128 may correspond to a temperature within the combustion chamber 128, and may be referred to as a detected fuel delivery parameter as the amount of fuel and oxygen provided to the combustion chamber 128 may change at least one of the temperature or the optical features. For example, the controller 144 may determine temperatures at various circumferential locations of the combustion chamber 128 through sensors 140 on fuel nozzles 124 circumferentially arranged around the combustor section 26, and a system level controller may perform an algorithm or other method to determine adjustments to the fuel supply for each of the individual fuel nozzles.

Based on the detected optical features, the controller 144 may determine an air/fuel ratio within a given combustion chamber 128. The controller 144 may be programmed to actuate the trim valve 134 to achieve a desired air/fuel ratio within the combustion chamber 128 and/or, balance the air/fuel ratio and/or fuel delivery to that of another sector of the combustion chamber 128 based on the detected fuel delivery parameter. The controller 144 may be used, for example, to minimize differences between the various sectors within the annular combustor 128 in a combustion system thereby reducing the cooling requirement on the turbine. Smoke, particulates and other engine emissions may also be reduced.

The combustor section 26 and system 151 provide several benefits over previously disclosed approaches. For example, the sensor 140 may fail to be exposed to fuel, combustion, or exhaust, thus increasing a lifespan of the sensor 140. Additionally, a temperature within the environment of the sensor 140 is lower than in the combustion chamber 128 and is more uniform, thus increasing ease of mechanical design and thermal protection of the sensor 140. Additionally, the sensor 140 may detect the optical features without looking through a flame within the combustion chamber 128, which may affect the detected information. This increases the likelihood of the detected optical features accurately reflecting the conditions within the combustion chamber 128. Additionally, because the sensor 140 is coupled to the fuel nozzle stem 136, the sensor 140 may be cooled from the fuel. Additionally, installation of the sensor 140 and the fuel nozzle 124 may be relatively easy due to the integration of the sensor 140 and the trim valve 134 in a single fuel nozzle 124.

Figure 3B:
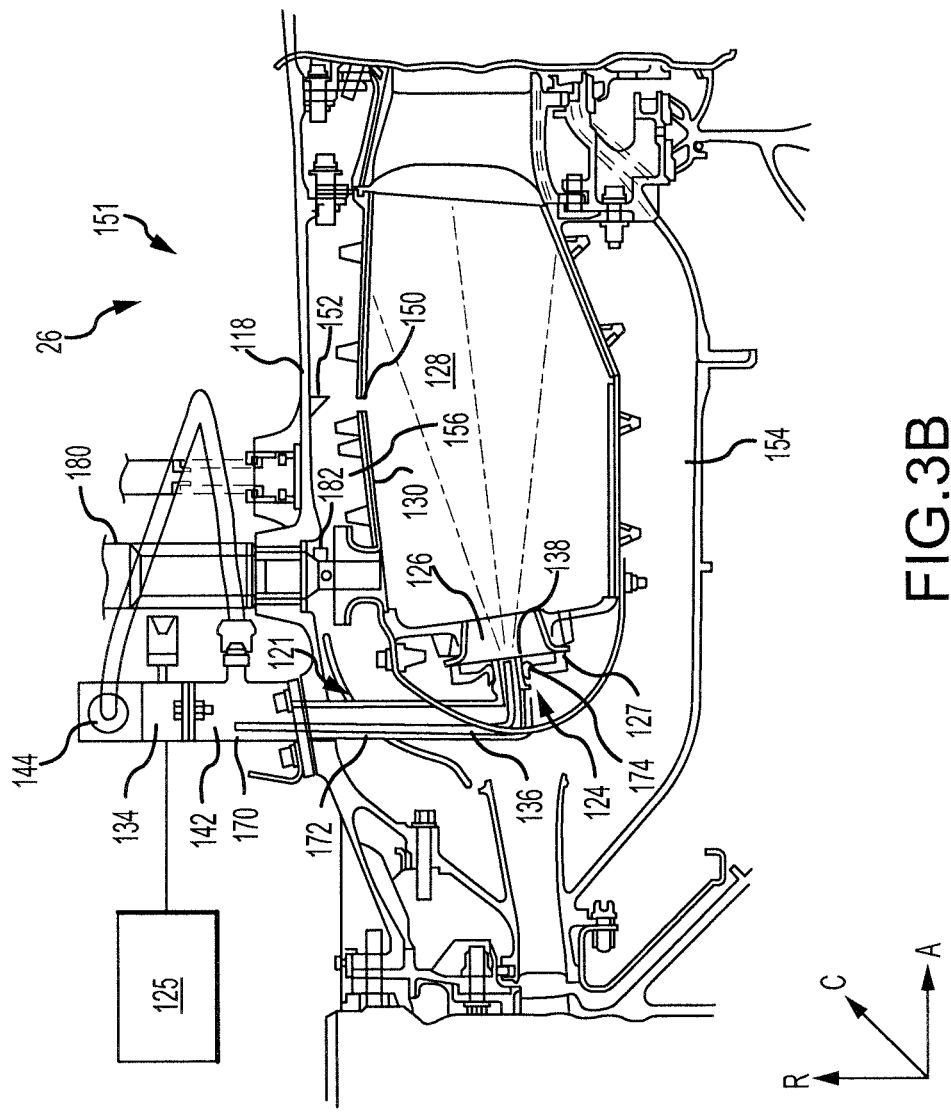
FIG. 3B illustrates another cross-sectional view of the portion of the combustor section of FIG. 2 that includes an igniter, in accordance with various embodiments.

Referring now to FIG. 3B, another cross-sectional view of the combustor section 26 is shown. The combustor section 26 may further include an igniter 180. The igniter may extend through the diffuser case 118 and the liner and shell assembly 130 and may ignite a mixture of fuel and oxygen in the combustion chamber 128. In various embodiments, a reflective surface 184 may be coupled to the diffuser case 118, and a sensor 182 may be coupled to the igniter 180. The sensor 182 and the reflective surface 184 may be oriented in such a manner that the reflective surface 184 reflects light from the combustion chamber 128 towards the sensor 182 such that the sensor 182 may detect optical data corresponding to an interior of the combustion chamber 128.

Figure 3C:
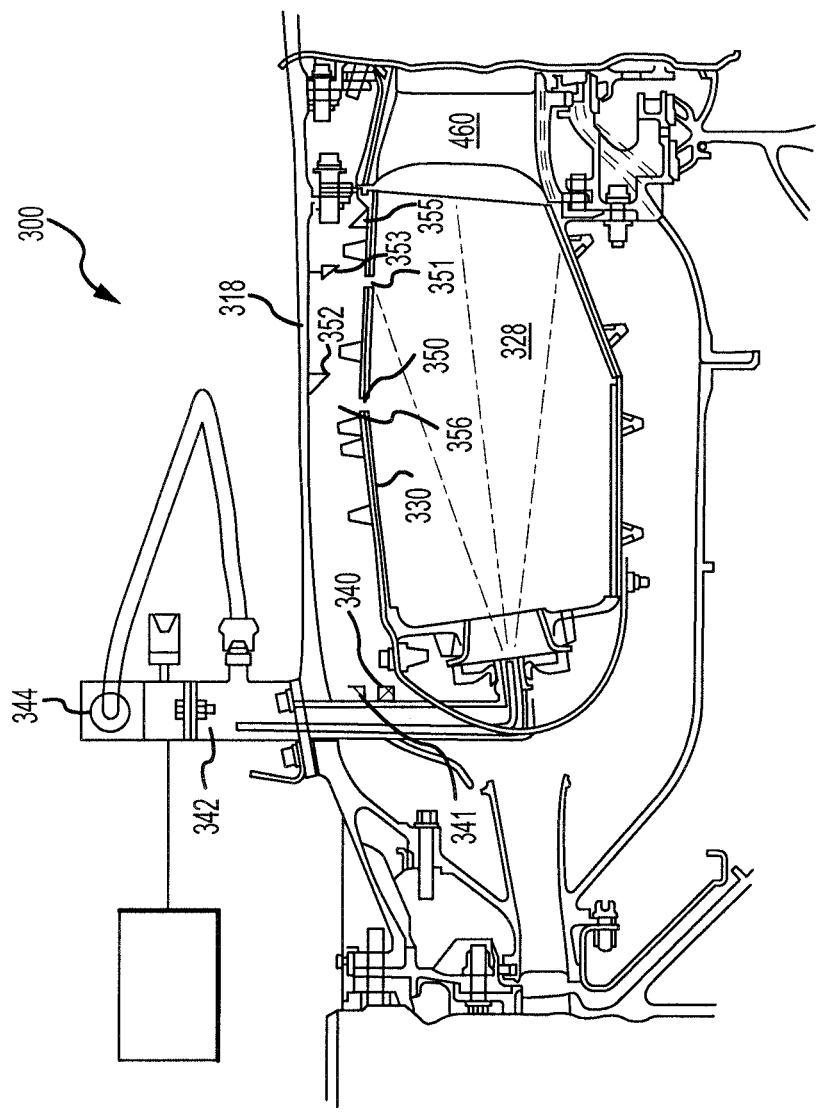
FIG. 3C illustrates a cross-sectional view of a portion of a combustor section of a gas turbine engine, in accordance with various embodiments.

Referring now to FIG. 3C, another combustor section 300 may include similar features as the combustor section 26 of FIG. 3A. However, the combustor section 300 may include two reflective surfaces 352, 352 located within an outer shroud 356 and suspended within the outer shroud 356 from a diffuser case 318. The first reflective surface 352 may receive optical features from a first opening 350 in a liner and shell assembly 330, and the second reflective surface 353 may receive optical features from a second opening 351 in the liner and shell assembly 330. A first optical sensor 340 is oriented in such a manner as to receive the reflected optical features from the first reflective surface 352, and a second optical sensor 341 is oriented to receive the reflected optical features from the second reflective surface 353. In various embodiments, a single optical sensor 340 may be designed to receive the reflected optical features from both the first reflective surface 352 and the second reflective surface 353. This arrangement may be more particularly focused on combustor lighting and may be used to control the amount and duration of sparking.

An optical decoder 342 may be designed to receive the detected optical features from the first optical sensor 340 and the second optical sensor 341. The optical decoder 342 may decode the reflected optical features from both of the optical sensors 340, 341. A controller 344 may receive a signal corresponding to decoded optical features from the first optical sensor 340 and the second optical sensor 341 and may determine characteristics within multiple locations of a combustion chamber 328 based on the decoded optical features from both of the optical sensors 340, 341. In various embodiments, a harness may be designed to receive the determined characteristics from multiple controllers 344 oriented about a circumference of the combustor section 300 and to determine control of trim valves of the various fuel nozzles based on the data received from the multiple controllers 344.

Another reflective surface 355 may be coupled to the liner and shell assembly 330. The reflective surface 355 may reflect optical features received from the opening 351 towards one or more sensor 340, 341. The controller 344 may determine optical characteristics of combustion based on the received data.

The combustor section 300 may include an airfoil 460. The airfoil 460 may include, for example, a turbine vane. It may be desirable to identify a temperature of the airfoil 460.

In that regard, the combustor section 300 may include a reflective surface, such as the reflective surface 355, that reflects optical features from a leading edge of the airfoil 460 through the outer shroud 356 towards a sensor, such as the sensor 340 or the sensor 341. The controller 344 may be coupled to the sensor 340 or 341 and may receive information corresponding to the reflected optical features. The controller 344 may determine a temperature of the airfoil 460 based on the reflected optical features received via the sensor 440.

Figure 4:
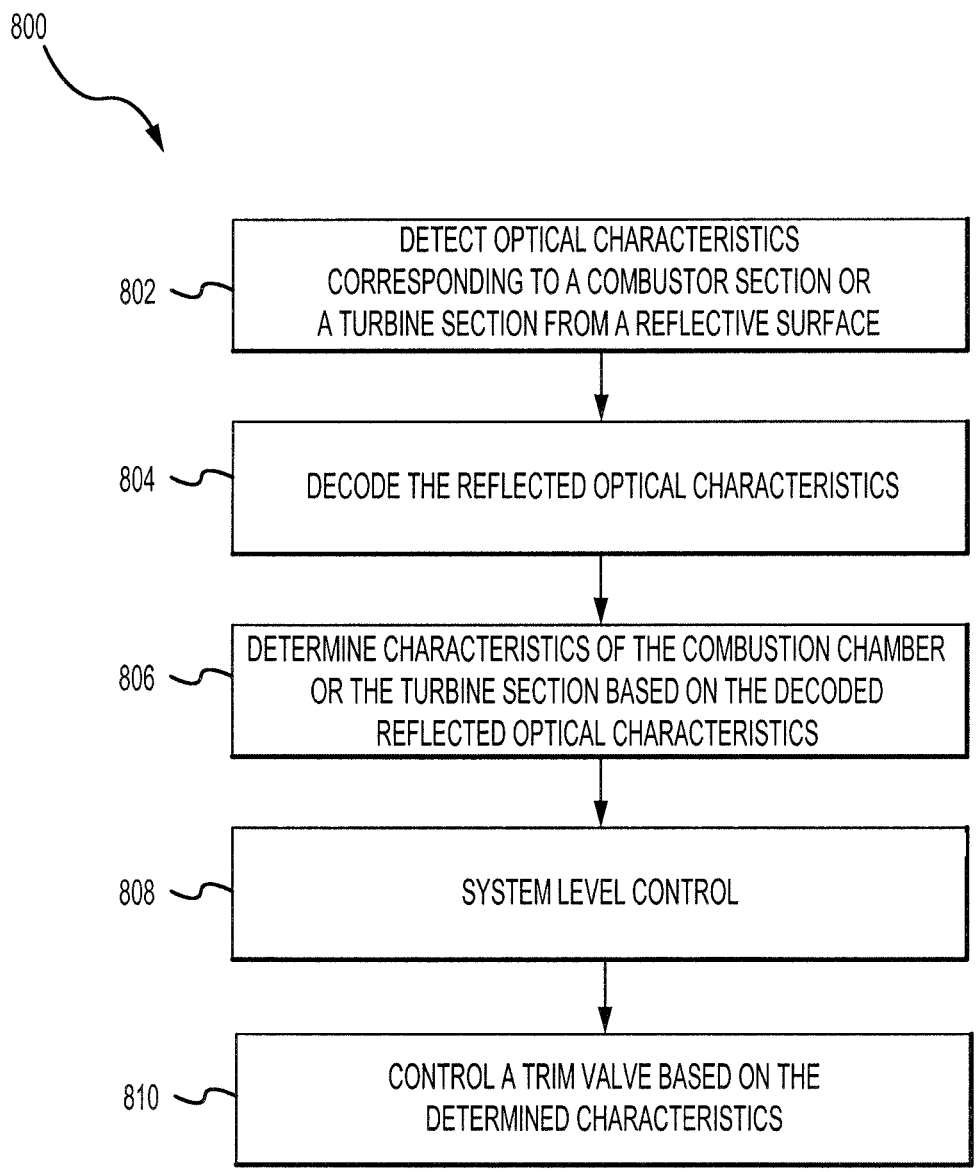
FIG. 4 illustrates a method for controlling a trim valve of a combustor section based on detected optical features, in accordance with various embodiments.

Referring to FIG. 4, a method 800 for controlling a trim valve of a fuel nozzle based on detected optical features corresponding to combustion in a combustor section of a gas turbine engine is shown. In various embodiments, turbine vanes (such as those shown in the drawings) may be considered to be part of a combustor section. The method includes, at 802, detecting optical characteristics corresponding to a combustor section of a gas turbine engine from a reflective surface. For example, an optical sensor may be coupled to a stem of a fuel nozzle or an igniter within the combustor section and may be situated to receive one or more reflections of optical characteristics within the combustor section.

In block 804, an optical decoder may decode the one or more reflected optical characteristics. For example, the optical decoder may be coupled to a fuel nozzle or igniter stem, may receive the reflected optical characteristics from the sensors, and may decode the reflected optical characteristics. An algorithm may analyze the decoded optical characteristics and may determine how controllers should be controlled based on the analysis.

In block 806, a controller may receive the decoded optical characteristics and may determine characteristics of the combustion chamber based on the decoded reflected optical characteristics. For example, the controller may identify a temperature within the combustion chamber or a sector of the combustion chamber, an amount of a particular gas or other element, a ratio of air to fuel within the combustion chamber, or the like based on the decoded reflected optical characteristics.

In block 808, a system level controller may perform an algorithm or other method to determine adjustments to the fuel supply for each of the individual fuel nozzles.

In block 810, the individual fuel nozzle controllers may control trim valves to adjust an air to fuel ratio provided by the fuel nozzle based on the determined characteristics and the data from the system level controller. For example, the controller may control the flow of fuel from the fuel nozzle for various reasons. These may include determining that ignition has occurred in the combustion chamber, ensuring complete combustion during spool up to prevent overly-rapid spool up, confirm an uneven distribution of fuel during part power up points to eliminate or reduce combustion noise, or controlling the flow of fuel so that all sectors have the same temperature at full power.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A sensor system for use in a gas turbine engine, comprising:
a reflective surface configured to reflect optical features corresponding to combustion in a combustion chamber that exit the combustion chamber via at least one opening therein;
a fuel nozzle having a fuel nozzle stem; and
an optical sensor coupled to the fuel nozzle stem, located outside of the combustion chamber, and configured to receive the reflected optical features from the reflective surface.

2. The system of claim 1, further comprising a liner and shell assembly and a diffuser case defining an inner shroud and an outer shroud between the diffuser case and the liner and shell assembly, wherein the reflective surface is at least partially located in at least one of the inner shroud or the outer shroud.

3. The system of claim 2, wherein the reflective surface is at least one of located on or defined by at least one of the diffuser case or the liner and shell assembly.

4. The system of claim 2, wherein the reflective surface is suspended in at least one of the inner shroud or the outer shroud.

5. The system of claim 2, wherein the reflective surface is configured to reflect the reflected optical features through at least one of the inner shroud or the outer shroud towards the optical sensor.

6. The system of claim 1, further comprising an optical decoder configured to receive a signal from the optical sensor corresponding to the reflected optical features and to decode the reflected optical features.

7. The system of claim 6, further comprising a controller coupled to the optical decoder and configured to receive a decoded signal from the optical decoder corresponding to the reflected optical features and to determine characteristics of the combustion chamber based on the decoded signal.

8. The system of claim 7, further comprising a fuel nozzle and a trim valve configured to adjust an amount of fuel injected by the fuel nozzle, wherein the controller is further configured to control the trim valve to adjust the amount of fuel injected by the fuel nozzle based on the characteristics of the combustion chamber.

9. The system of claim 8, wherein the reflected optical features include infrared light waves, and the characteristics of the combustion chamber correspond to a temperature within the combustion chamber.

10. The system of claim 1, further comprising a second optical sensor and a second reflective surface located axially forward or axially aft relative to the first reflective surface, wherein:
the second reflective surface is configured to reflect second reflected optical features of the combustion chamber received via the second opening towards the fuel nozzle; and
the second optical sensor is configured to receive the second reflected optical features from the second reflective surface.

11. The system of claim 1, further comprising an igniter configured to ignite the fuel in the combustion chamber, wherein the optical sensor is coupled to the igniter.

12. A sensor system for use in a gas turbine engine, comprising:
a combustor component in communication with a combustion chamber of the gas turbine engine;
a liner and shell assembly;
a diffuser case defining an inner shroud and an outer shroud between the diffuser case and the liner and shell assembly;
a reflective surface configured to reflect optical features corresponding to combustion in the combustion chamber towards the combustor component, the optical features being reflected through at least one of the inner shroud or the outer shroud; and
an optical sensor coupled to the combustor component and configured to receive the reflected optical features.

13. The system of claim 12, further comprising an airfoil located in a high pressure turbine section of the gas turbine engine, wherein the reflected optical features correspond to the airfoil.

14. The system of claim 12, wherein:
the liner and shell assembly defines at least one opening into the combustion chamber; and
the reflective surface is configured to reflect the reflected optical features of the combustion chamber received via the at least one opening towards the optical sensor.

15. The system of claim 12, wherein the reflective surface is at least one of located on or defined by at least one of the diffuser case or the liner and shell assembly.

16. The system of claim 12, wherein the combustor component includes at least one of a fuel nozzle or an igniter.

17. The combustor component of claim 16, wherein the combustor component is at least one of a fuel nozzle or an igniter.

18. A combustor component for use in a gas turbine engine, comprising:
a first section configured to be mounted to a diffuser case of the gas turbine engine;
a third section configured to be in communication with a combustion chamber of the gas turbine engine;
a second section extending between the first section and the third section; and
a sensor located on the second section and configured to detect an optical property of combustion that occurs within the combustion chamber during operation of the gas turbine engine.

* * * * *